United States Patent

Hentze et al.

[11] Patent Number: 5,504,302
[45] Date of Patent: Apr. 2, 1996

[54] METHOD AND DEVICE FOR THE PRODUCTION OF OPTICAL LENSES OR THE LIKE

[76] Inventors: Joachim Hentze; Vitaly N. Lissotschenko, both of Welandsborn 15, D-4797, Schlangen, Germany

[21] Appl. No.: 35,073

[22] Filed: Mar. 22, 1993

[30] Foreign Application Priority Data

Oct. 15, 1992 [DE] Germany .......................... 42 34 740.8

[51] Int. Cl.⁶ .............................. B23K 15/00; B23K 15/08
[52] U.S. Cl. .................... 219/121.12; 219/121.2; 219/121.17; 219/212.35; 359/900
[58] Field of Search ......................... 219/121.65, 121.66, 219/121.83, 121.68, 121.69, 121.19, 121.16, 121.17, 121.2, 121.35; 359/900, 708

[56] References Cited

U.S. PATENT DOCUMENTS

| | | |
|---|---|---|
| 4,319,889 | 3/1982 | Villalobos . |
| 4,348,263 | 9/1982 | Draper et al. .............................. 204/29 |
| 4,563,565 | 1/1986 | Kampfer et al. .................. 219/121 LY |
| 4,609,259 | 9/1986 | Suemitsu et al. . |
| 5,148,322 | 9/1992 | Aoyama et al. . |
| 5,179,262 | 1/1993 | Portney ............................. 219/121.68 |
| 5,317,661 | 5/1994 | Szentesi et al. .......................... 385/31 |

FOREIGN PATENT DOCUMENTS 321901  6/1989  Japan .

OTHER PUBLICATIONS

Y. A. Carts, "Micro-optics has macro potential", Laser Focus World, vol. 27, No. 6, 1991.

D. Daly et al., "The manufacture of microlenses by melting photoresist", Measurement Science and Technology, vol. 1, No. 8, 1990, pp. 759–766.

V. W. B. Velclkamp et al., "Binare Optik", Spektrum der Wissenschart, Jul. 1992, pp. 44–50.

Primary Examiner—Mark H. Paschall
Attorney, Agent, or Firm—Browdy and Neimark

[57] ABSTRACT

A method for the production of optically operating structures, particularly of lenses and lens arrays and prisms, with which in at least one masking step (MS) a base structure (10) that is optically operating in steps is formed on the surface of a substrate (1) in at least one masking step (MS) with a subsequent etching step (AS) and is then smoothed by capillary surface forces of the melted substrate in a melting step by means of heating to melting, characterized in that in the melting step (SS) the substrate (1) that carries the base structure (10) is placed inside a vacuum chamber (3), and then to charge the base structure (10) in a strip-like manner with a high-voltage-accelerated electron beam (4), which simultaneously moves on the substrate (1) perpendicularly and in respect to a melting zone (11) operated by the electron beam (4) on the base structure (10), with such an energy density that the melting zone (11) has a depth (T) that corresponds to at least one step height (H) of the stepped base structure (10). A device for executing the method and novel products produced by the method are disclosed.

21 Claims, 2 Drawing Sheets

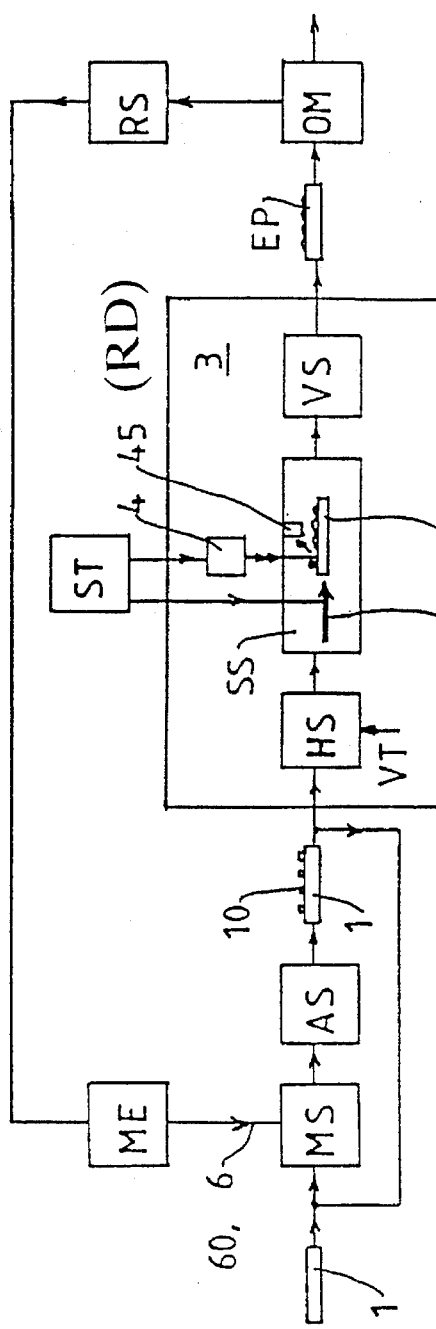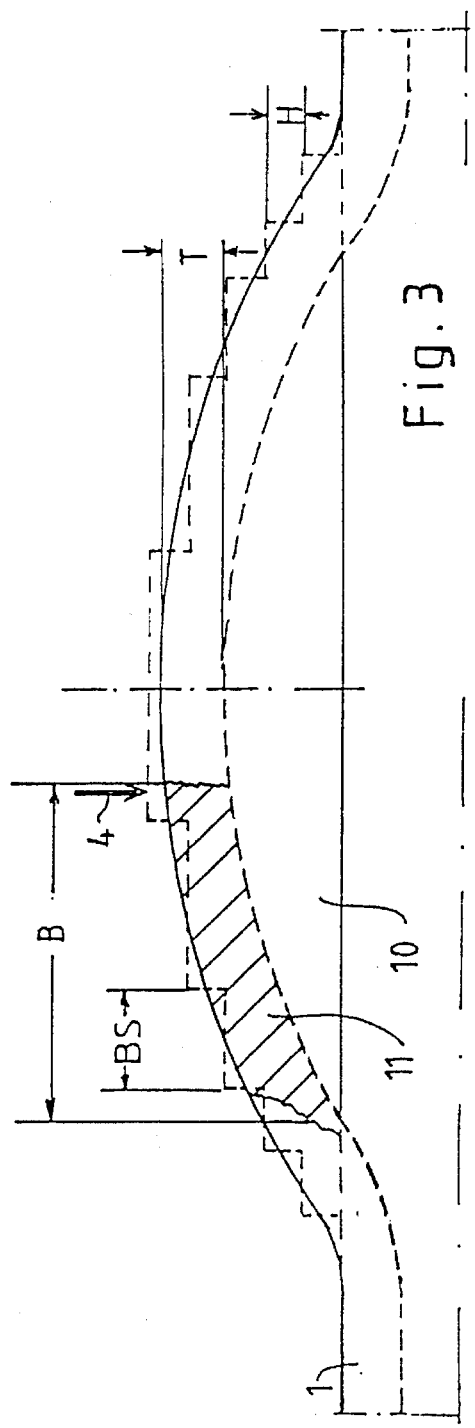

METHOD AND DEVICE FOR THE PRODUCTION OF OPTICAL LENSES OR THE LIKE

FIELD OF INVENTION

The invention relates to a method for the production of optically operating structures, particularly of lenses and lens arrays and prisms in which a basic structure that optically operates in steps or stages is formed on the surface of a substrate in at least one masking step with a subsequent etching step and is then smoothed in a melting step by capillary surface forces of the melted substrate.

BACKGROUND OF THE INVENTION

A method of this general type is disclosed in the magazine "Laser Focus World", 1991, pp 93–99. In this article an overview of the six different conventional methods for producing microlenses and microlens arrays is described. The closest method includes the production of an approximately lens-shaped structure on the surface of a substrate by means of photolithographic masking and subsequent etching, which is subjected to heat treatment, because of which a minor mass transport results, which, with certain materials, leads to qualitatively good lenses. The lithography is performed with a plurality of masks that are respectively aligned, so that the totality of the sequentially etched and stepped structures approximately form the lens. The heat treatment leads to complete melting of the lens material and also of the entire carrier substrate. During this melting the surface tension produces a deformation of the entire surface and of the lens mass as well as of the surrounding substrate; although the stepped structure is reduced, the optical parameters of the lens are changed drastically, leading to optical errors and to severe dispersions and deviations of the lens characteristics with respect to a respectively given characteristic.

Moreover, it is known from the magazine "Spektrum der Wissenschaft [Spectrum of Science]", 1992, pp. 44–50, Veldkamp et al, Binary Optics, to etch a planar diffractive lens into the planar face of a planar-convex refractive lens, where the opposing color aberrations of the refractive and the diffractive optics mutually compensate each other and color fidelity is attained over a broad spectral scope. The etched refractive lens, however, produces a light scatter by means of its etched end face that reduces the image contrast. To avoid this error over a wide wave range, a large number of masking and etching steps are used, for example up to twelve, wherein the etching is performed at a decreasing step height. This means high production costs and causes a considerable amount of rejections, i.e. unsatisfactory product which is waste.

SUMMARY OF THE INVENTION

It is an object of the invention to overcome deficiencies in the prior art, such as indicated above. Another object is to provide a method and a device that permit the industrial production of structured optical arrangements, particularly lens arrays, with high precision and narrow tolerances of the optical data, and the resultant novel optical structures so produced.

These objects are attained by placing, during the melting step, the substrate that carries the base structure inside a vacuum chamber, and then moving the base structure beneath and past a generally fan-shaped high-voltage-accelerated electron beam, which projects downwardly onto the substrate as the substrate moves thereby, the plane of the electron beam defining the front of a melting zone created by the electron beam on the base structure, the beam being provided with such an energy density that the melting zone has a depth that corresponds to at least one step height of the stepped base structure.

The electron beam is preferably produced with a linear electron beam gun the anode voltage of which amounts to several kilovolts, so that the radiation impacting upon the substrate ejects therefrom a sufficient number of secondary electrons so that a continual charging of the substrate is effected, and the substrate is charged with respect to the electron source to such a voltage that is lower than the energy of the electrons of the electron beam. In this way the exact measurement of the beam energy charge in the melting zone of the substrate can be taken using the voltage or the proportion of the electrons produced in the electron source. In conjunction with the longitudinal rate of feed of the substrate with respect to the the melting zone, the penetration depth of the melting zone into the substrate can be controlled precisely. This allows selection of a suitable melting zone width and depth for a respectively given substrate adapted to its melting and surface tension conditions, which leads to a well-defined leveling of the steps that had resulted during the preceding production step for the base structure.

The tension conditions between the anode voltage and the voltage to which the substrate is charged can be advantageously stabilized by arranging the substrate on a carrier that has a specific conductivity less, by at least one order of magnitude, than the substrate.

It has proven to be advantageous to select the melting zone approximately 1 to 5 step heights deep and frequently even near a step height. The width of the melting zone is generally designed to be several step heights wide, and it is particularly at least 2 to 20 step heights wide.

Another variability of the process is brought about by the arrangement of a pre-heating muffle furnace in the vacuum chamber in which the substrate is thermo-statically heated before melting of the surface takes place. It has proven to be advantageous to preheat the substrate to within approximately 50 to 100K below the melting or softening temperature of the material of the base structure. This facilitates, for example, the melting of quartz, from which high-quality lenses and lens arrays can be produced. Metals that can be used as, for example, optical mirrors can also be melted by an electron beam, and preheating is also recommended here.

Because the process of melting the surface and therefore the removal of the stepped structure permits the production of extraordinarily high-quality optics, it has proven to be advantageous in some cases to use in a corrective manner those deviations which occur from the ideal shape, these being generated during etching and progressive melting of zones respectively during production of the masks. By doing this an additional undercut is provided along the contours and a directionally-oriented pre-distortion is made in the masks, which leads to the removal of the production-related errors during melting.

The masking and etching step or a varied sequence of these can be performed with the standard methods of photolithography, laser lighting of the mask materials or electron beam lighting of the mask materials, whereupon the etching step can be performed with a liquid or gaseous etching medium, particularly also by plasma etching or ion etching, depending on the type of substrate and the required precision. In principle, a production of the base structure can also be achieved by means of mechanical processing.

The method is also particularly suited for production of a confocal, planar lens arrangement the steps of which are definitively inclined and rounded off at the edges and bottoms in such a way that the detrimental influences of the step end faces and possibly those of the undercut are eliminated.

The high uniformity of the optical data of the produced lenses of a lens array that are assured by the present method permit its confocal construction for all lenses by shaping the individual lenses aspherically and correcting them during the melting step with respect to the optical errors. By means of this operation optical systems are produced that nearly have the aperture 1, which is very difficult to achieve in conventionally produced individual lenses.

As is known, the novel lenses or lens structures can advantageously be applied as compensatory or corrective lenses to a plane face of a refractive lens. By means of the smoothing melting process in accordance with the present invention, the properties reducing the contrasts in the etched step structure are eliminated or significantly reduced, so that a substantially lower number of steps is sufficient to attain the same quality. In general, a single step is adequate.

The corrective lens is arranged on a separate plate in front of or behind the refractive lens. It is also advantageous to provide the use of corrective lenses in connection with high-quality individual lenses that are measured after their production, for which a laser scanner for example is used, image errors of which are systematically evaluated. A corrective lens structure for an individual case is calculated with the acquired measurement data and the mask set is subsequently produced that serves in the production of the corrective lenses. Here, too, a low-dispersion corrective lens can also be produced with few mask and etching steps because of the subsequent melting of the steps during the surface melting. The melting causes the formation of undulating profiles of the flat structures. The optical characteristics of such structures can be well described mathematically, and the mask calculation can thus be performed with high precision, because the structural changes caused by the melting of the steps can be predetermined and taken into account in the calculation. Besides the lenses, the combination of the measured system having corrective plates or corrective structures on planar surfaces can also be applied to other optical systems, for example to prisms or prism arrays.

Surface optical waveguide optics can also advantageously be developed with the method in accordance with the present invention. In this way confocal, sector-shaped pattern structures or also lens-shaped recesses can be created the focus of which lies in the surface optical wave guide and is oriented to, for example, a narrow filament-shaped or strip-shaped optical wave guide or optical wave guide section.

Mirror surfaces of concave mirrors, concave mirror arrays, optical grids, etc. can be produced by the method. The structure can be made directly in high-quality reflective metal surfaces, for example, of silver or chromium, or they can be produced on a material that can be later mirrored. The surface can advantageously be vacuum-mirrored by feeding the substrate into a vacuum-coating device of the vacuum chamber after completion of the melting process.

The device for executing the method is advantageously designed for a plurality of substrates that pass in succession through a muffle furnace that performs the preheating, and then are guided past the electron emitter. The substrate feed is triggered in a controlled manner, the same as the various electrodes and the electron source are supplied in a controlled manner by a control device. It has proven advantageous for the control to compare a measurement signal of a beam sensor focused on the melting zone with a preset emission value, and to perform the control in such a way that the difference of the two values is as close as possible to zero.

BRIEF DESCRIPTION OF DRAWING

Advantageous embodiments are represented in FIGS. 1 through 5:

FIG. 1 schematically shows the course of the method;

FIG. 3 shows a cross-section through a substrate;

DETAILED DESCRIPTION OF EMBODIMENTS

Figure 2:
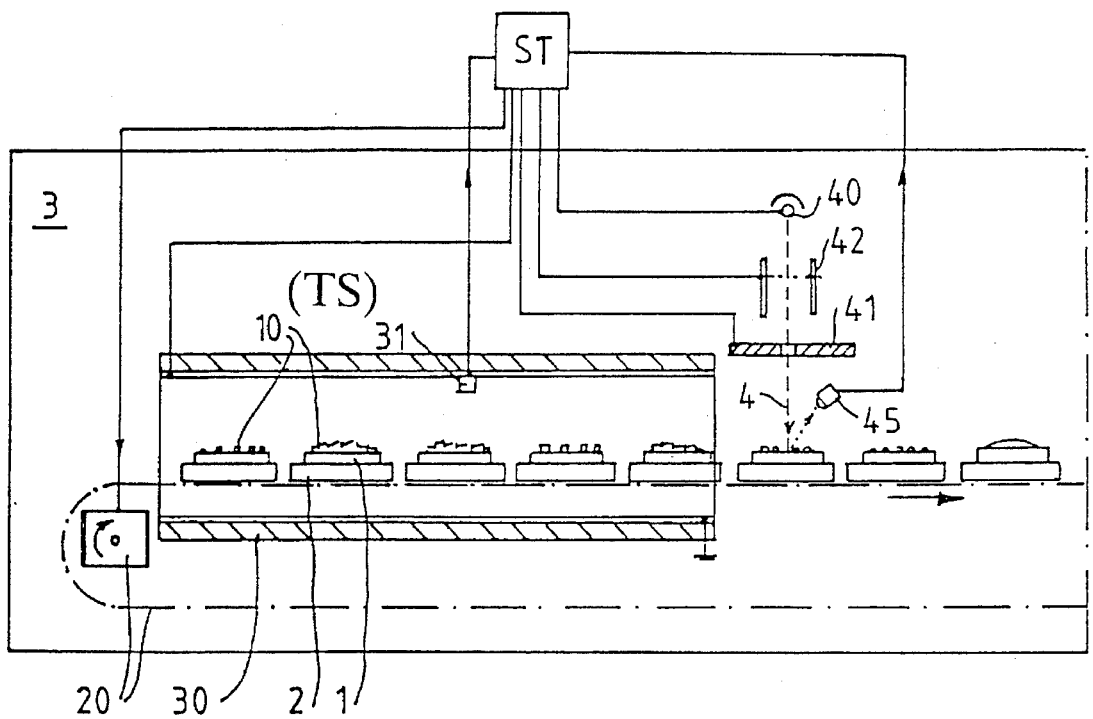
FIG. 2 shows a cross-section of a device for executing the method.

FIG. 1 shows a schematic view of the course of the method. The substrate (1) is coated, irradiated and opened in a first masking step (MS) and etched out in step form in a subsequent etching step (AS). For planar structures, one masking step and one etching step are sufficient; for multi-dimensional structures, these two steps must be repeated several times with appropriate masks. The substrate (1) having the base structure (10) produced in this way is smoothed in the subsequent melting step (SS). A preheating step (HS) can precede the melting step (SS) in that the substrate (1) with the base structure (10) is heated to a preheating temperature (VT) that is close to the melting or softening temperature of the base structure.

The melting step is effected by controlling the energy density of the electron beam and the rate of feed of the substrate (1) perpendicular to the vertical plane defined by, or the extension of, the front of the melting zone, i.e. the plane of the electron beam. As a control value, the temperature of the melting zone is measured with a beam sensor (45) and supplied to a control device (ST) as an actual value. The melting step (SS) takes place in a vacuum chamber (3). This controls the electron gun and the feed drive of the substrate feeding device (20). If the optical structure comprises mirror elements, a mirror-coating step (VS), which is advantageously effected by means of vacuum deposition in a vacuum chamber, follows the melting step (SS).

On the basis of an optical measurement (OM) of the optical data of the end product (EP), the respective deviations from an ideal form are determined and correctively taken into account via a calculation step (RS) in a mask production step (ME) for the production of the masks (6).

FIG. 2 shows the device for performing the melting step. It comprises a vacuum chamber (3), which encloses a feed device (20) such as a conveyor, which feeds carriers (2) at a level of the substrate, on which the substrates (1) are arranged. The carriers (2) advantageously consist of highly-insulating aluminum oxide. The carrier and substrates pass through a muffle furnace (30), which is represented as being open, where the preheating takes place. This oven is electrically heated with thermostatic control. The carriers (2)

with the substrates (1) exit from the downstream end of the oven (30) to the area of the electron beam (4).

FIG. 3 shows a cross-section perpendicular to the plane of the electron beam, i.e. a partial longitudinal section along the length of the melting zone. As shown in FIG. 2, the electrons are released in a resistance wire that serves as an electron source (40) and then accelerated in the direction of a slotted anode (41). The anode is charged by a controlled high voltage of a few kilovolts. Along the path to the anode (41), the electrons pass focusing electrodes (42) on the side, which are charged by a focusing voltage. The accelerated electrons exit the anode slot as a linear electrode beam (4) and charge the substrate below with the base structure (10) thereupon.

A radiation detector (45) whose output signal is supplied to a control device (ST) is arranged above the melting zone which is being created in the area of impact of the electron beam (4) on the substrate (1). This control device controls the high voltage, the focus voltage, the current of the electron source and the feed rate of the feed device (20). It is useful that the electrical heating of the muffle furnace (30) is controlled via the control device (ST), wherein the signal of a temperature sensor (31) is supplied to the control device as the actual signal.

FIG. 3 shows, in a highly magnified manner, a vertical section through a substrate that carries a lens. The base structure (10) of the lens is shown in dot-dash lines and has steps with a step height (H). A melting zone (11) of selected thickness is also represented, which results from the charging by the electron beam (4) during the continuous throughput of the substrate. This melting zone (11) has a depth or thickness (T) that corresponds to approximately 1.5 step heights (H) and has a width (B) that overlaps, in this example, three mean step widths (BS). The final form of the optical element is shown as solid lines. This final form results during the melting of the surface material as a result of the surface tension of the melted mass. The surface tension equalizes and eliminates the stepped structure and creates an approximately ideal optical surface. It can be seen that the steps show a slight undercut that is, however, completely eliminated after melting.

Figure 4:
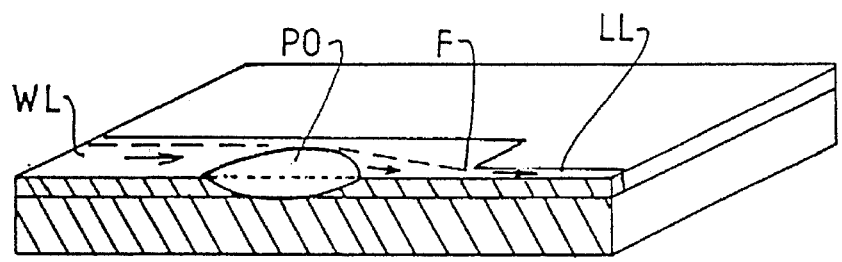
FIG. 4 shows a view of a surface optical wave guide having an optical structure.

FIG. 4 shows, in section and in perspective, a planar optical device (PO) in a lithium niobate crystal, in which a surface optical wave guide (WL) is embodied. The optical arrangement is directed confocally toward the focus (F). In this example, this focus lies on the edge of the crystal, where a narrow fiber optical wave guide strip (LL) is connected.

Figure 5:
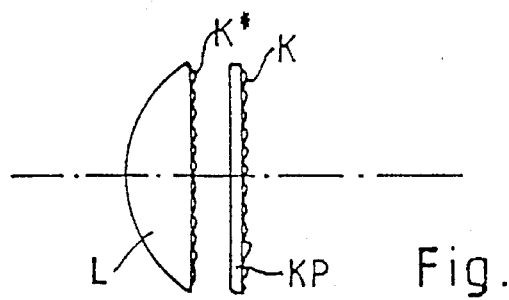
FIG. 5 shows an optical system that includes a corrective plate.

FIG. 5 shows a refractive, plano-convex lens (L) on whose plane face a compensatory or corrective structure (K*) has been produced in accordance with the method and is embodied as undulating because of melting. The compensatory structure (K*) is a planar lens that has a color coefficient different from that of the refractive lens (L), so that a wide-band color correction is attained with low dispersion losses because of the undulating structure. As an alternative, a corrective structure (K) or a compensatory structure on a corrective plate (KP) is produced, that is, placed in front of or behind one lens (L) or, if need be, a plurality of lenses of a system.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. In a method for the production from a base of an optical element that has a series of steps of height (H) on a surface on said base (10), formed by at least one masking step (MS), a subsequent etching step (AS), heating said surface to effect melting of said surface, and smoothing of said surface by capillary surface forces, the improvement comprising:

said melting being carried out by placing said base inside a vacuum chamber (3), sweeping a fan-shaped high-voltage accelerated electron beam (4) over said base by relative motion of said electron beam (4) and said base so that said electron beam impinges upon said base along a line generally perpendicular to the motion, a plane of the electron beam defining a front of a melting zone (11), said electron beam (4) being provided with an energy density such as to create the melting zone having a depth (T) into said base that corresponds to at least one step height (H) of said base.

2. A method in accordance with claim 1, wherein the electron beam is charged with an acceleration voltage of at least 2 kilovolts (kV).

3. A method in accordance with claim 2, wherein said acceleration voltage is 2–5 kV.

4. A method in accordance with claim 1, wherein said depth (T) of the melting zone corresponds to 1 to 5 step heights (H).

5. A method in accordance with claim 4, wherein said melting zone corresponds to 1 to 2.5 step heights (H).

6. A method in accordance with claim 1, wherein said electron beam is focused in strips on the base (10) in such a way that the melting zone (11) charged by it has a width (B) that corresponds to at least 2 mean step widths (BS).

7. A method in accordance with claim 1, further comprising pre-heating said base in said vacuum chamber in a pre-heating step (HS) to a pre-heating temperature (VT) of within approximately 50°–100° K. below the melting or softening temperature of the material of the base (10).

8. A method in accordance with claim 1, wherein said steps are formed by a masking procedure (MS) which is carried out so as to provide a stepped base having a predetermined, predistorted configuration utilizing a base form so that during said melting said predistorted base is equalized in accordance with said given base form.

9. A method in accordance with claim 1, wherein said masking (MS) is performed by photolithography, laser lighting or electron lighting, and the subsequent etching step (AS) is performed with a liquid or gaseous etching medium.

10. A method according to claim 9, wherein said subsequent etching step (AS) is performed by plasma etching or ion beam etching.

11. A method in accordance with claim 1, characterized in that during mask preparation (ME) a mask (6) corresponds to a given ideal form and is circumferentially supplemented with an additional undercut on its contours, so that during melting of the base (10) masked in this way and etched afterwards, an optical structure corresponding to the ideal form results.

12. A method in accordance with claim 1, characterized in that a given lens (L) system is measured and, as a function of the optical errors of the latter, for example, chromium aberration, a mask or group of masks (60) is calculated and subsequently produced to correspond to the structure of a corrective or compensatory optical element (K, K*), whereupon the compensatory optical element (K*) is produced with these masks (60) in the method steps of the masking step (MS), the etching step (AS) on a planar surface of the lens (LL) or on a corrective optic plate (KP).

13. A method in accordance with claim 1, characterized in that a lens array base structure is produced in the masking and etching steps (MS, AS) whose individual lenses are embodied aspherically and oriented to the common focus of the lens array and are shaped into the respective, aspherical ideal form afterwards in the subsequent melting step (SS).

14. A method in accordance with claim 1, characterized in that the base structure is etched into a surface optical wave guide (WL), lithium niobate, and has a confocal sector-shaped or lens-shaped structure whose focus (F) lies in the surface optical wave guide (WL).

15. A method in accordance with claim 1, characterized in that the optically effective structure is produced as a mirror surface on a metallic substrate (1) that consists of silver or chromium or is mirrored following the melting step (SS) in a mirror-coating step (VS), preferably by means of vacuum-mirroring.

16. The method according to claim 1, wherein the optical element consists of glass or quartz and said surface is aspherical after the step of sweeping the electron beam over the surface.

17. The method according to claim 1, further comprising the steps of:

providing inside the vacuum chamber (3), for producing the electron beam (4), a strip-shaped electron source (40), a downstream, slotted, high-voltage-charged anode (41), and lateral focusing electrodes (42);

charging the lateral focusing electrodes with a focusing voltage;

disposing the lateral focusing electrodes perpendicularly at a distance from a substrate level at which a carrier (2) is to be arranged with at least one substrate (1);

providing a feeding device (20); and feeding the substrate at a controlled feed rate at the substrate level.

18. The method according to claim 17, further comprising the steps of:

providing a muffle furnace (30) disposed within the vacuum chamber (3);

electrically heating the muffle furnace under thermostatic control;

enclosing the feeding device (20) in the muffle furnace (30);

arranging at least one substrate (1) in the muffle furnace (30);

generating the electron beam (4) selectively inside and outside of the muffle furnace (30).

19. The method according to claim 17, further comprising the steps of:

disposing, adjacent to the melting zone (11), a beam detector (45);

supplying an emission signal of the beam detector to a control device (ST);

triggering with the control device high voltage of the anode (41), a heating current (IH) of the electron source (4), and the rate of feed of the feeding device (20) with respect to a given radiation value (SW).

20. An optical element made by the process of claim 1.

21. The optical element according to claim 20, wherein the surface is a compensatory optical surface for correcting a fault of the optical element, and wherein the compensatory optical element is selected from the group consisting of a corrective optical plate and a planar lens surface of a faulty lens.

* * * * *